(12) United States Patent
Kim

(10) Patent No.: US 11,718,326 B2
(45) Date of Patent: Aug. 8, 2023

(54) APPARATUS FOR CONTROLLING AUTOMATED DRIVING, AND METHOD THEREOF

(71) Applicants: HYUNDAI MOTOR COMPANY, Seoul (KR); KIA MOTORS CORPORATION, Seoul (KR)

(72) Inventor: Dae Young Kim, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 152 days.

(21) Appl. No.: 17/076,513

(22) Filed: Oct. 21, 2020

(65) Prior Publication Data
US 2021/0387638 A1    Dec. 16, 2021

(30) Foreign Application Priority Data
Jun. 10, 2020   (KR) ........................ 10-2020-0070350

(51) Int. Cl.
*B60W 60/00*     (2020.01)
*B60W 40/08*     (2012.01)
(Continued)

(52) U.S. Cl.
CPC .......... *B60W 60/005* (2020.02); *B60W 40/08* (2013.01); *B60W 50/14* (2013.01);
(Continued)

(58) Field of Classification Search
CPC .... B60W 60/005; B60W 40/08; B60W 50/14; B60W 60/0016; B60W 2040/0818;
(Continued)

(56) References Cited

U.S. PATENT DOCUMENTS 5,906,645 A * 5/1999 Kagawa ................ B60W 50/12
                                                               701/88
2010/0222976 A1* 9/2010 Haug .................... B60W 30/12
                                                              340/439

(Continued)

FOREIGN PATENT DOCUMENTS

| EP | 2392501 | 12/2011 |
| EP | 3552909 | 10/2019 |
| WO | WO-2019124534 A1 * | 6/2019 ............ B60W 10/04 |

OTHER PUBLICATIONS

English Translation: Fujii et al., WO 2019/124534 A1, Jun. 27, 2019, WIPO Patent Application Publication (Year: 2019).*

(Continued)

*Primary Examiner* — Nadeem Odeh
(74) *Attorney, Agent, or Firm* — Morgan, Lewis & Bockius LLP

(57) ABSTRACT

The present invention relates to an autonomous driving control apparatus and an autonomous driving control method, and an exemplary embodiment of the present invention provides the autonomous driving control apparatus including: a driver seating sensor configured to recognize whether or not the driver is seated; a driver monitoring device configured to recognize whether a driver is looking ahead; and a processor configured to determine whether control authority is switchable for activating an autonomous driving control function based on sensing results of the driver seating sensor and the driver monitoring device.

15 Claims, 11 Drawing Sheets

(51) Int. Cl.
*B60W 50/14* (2020.01)
*B60W 50/00* (2006.01)

(52) U.S. Cl.
CPC . *B60W 60/0016* (2020.02); *B60W 2040/0818* (2013.01); *B60W 2040/0881* (2013.01); *B60W 2050/0082* (2013.01); *B60W 2540/10* (2013.01); *B60W 2540/12* (2013.01); *B60W 2540/225* (2020.02); *B60W 2540/229* (2020.02)

(58) Field of Classification Search
CPC . B60W 2040/0881; B60W 2050/0082; B60W 2540/10; B60W 2540/12; B60W 2540/225; B60W 2540/229; B60W 2040/0854; B60W 2050/143; B60W 2050/146; B60W 2540/223; B60W 60/0059; B60W 60/0051; B60W 40/09; B60N 2/002; B60N 2002/0268; B60K 26/021; B60T 7/042; B60T 2220/04
See application file for complete search history.

(56) References Cited

U.S. PATENT DOCUMENTS

| | | | |
|---|---|---|---|
| 2018/0093675 A1 | 4/2018 | Holub et al. | |
| 2019/0291747 A1* | 9/2019 | Chiba | B60W 30/00 |
| 2019/0317495 A1 | 10/2019 | Yang et al. | |
| 2020/0064833 A1 | 2/2020 | Fox et al. | |

OTHER PUBLICATIONS

European Search Report for European Application No. EP 20 20 3327 dated Mar. 29, 2021 (10 pages).

* cited by examiner

| [CONDITION1] | AND | RECOGNIZING THAT DRIVER IS SEATED THROUGH DRIVER SEATING SENSOR |
| --- | --- | --- |
| | | RECOGNIZING DRIVER OR THAT DRIVER IS LOOKING AHEAD THROUGH DRIVER MONITORING CAMERA |
| [CONDITION2 - case1] | AND | UNABLE TO RECOGNIZE THAT DRIVER IS SEATED THROUGH DRIVER SEATING SENSOR |
| | | UNABLE TO RECOGNIZE DRIVER THROUGH DRIVER MONITORING CAMERA |
| [CONDITION2 - case2] | AND | UNABLE TO RECOGNIZE THAT DRIVER IS SEATED THROUGH DRIVER SEATING SENSOR |
| | | DETERMINING THAT DRIVER IS NOT LOOKING AHEAD THROUGH DRIVER MONITORING CAMERA ALTERNATIVELY, DETERMINING THAT DRIVER IS NOT LOOKING AHEAD CONTINUOUSLY FOR A SECONDS OR MORE THROUGH DRIVER MONITORING CAMERA |
| [CONDITION2 - case3] | AND | UNABLE TO RECOGNIZE THAT DRIVER IS SEATED CONTINUOUSLY FOR B SECONDS OR MORE THROUGH DRIVER SEATING SENSOR |
| | | DETERMINING THAT DRIVER IS NOT LOOKING AHEAD THROUGH DRIVER MONITORING CAMERA |

Fig.2B

| | | | |
|---|---|---|---|
| [CONDITION3] | AND | OR | RECOGNIZING THAT DRIVER IS SEATED THROUGH DRIVER SEATING SENSOR |
| | | | RECOGNIZING DRIVER OR THAT DRIVER IS LOOKING AHEAD THROUGH DRIVER MONITORING CAMERA |
| | | | RECOGNIZING HANDS-ON OF STEERING WHEEL |
| [CONDITION4 - case1] | AND | | UNABLE TO RECOGNIZE THAT DRIVER IS SEATED THROUGH DRIVER SEATING SENSOR |
| | | | UNABLE TO RECOGNIZE DRIVER THROUGH DRIVER MONITORING CAMERA |
| [CONDITION4 - case2] | AND | | UNABLE TO RECOGNIZE THAT DRIVER IS SEATED THROUGH DRIVER SEATING SENSOR |
| | | | RECOGNIZING HANDS-ON OF STEERING WHEEL |
| | | | DETERMINING THAT DRIVER IS NOT LOOKING AHEAD CONTINUOUSLY FOR C SECONDS OR MORE THROUGH DRIVER MONITORING CAMERA ※ C > A |
| [CONDITION4 - case3] | AND | | UNABLE TO RECOGNIZE THAT DRIVER IS SEATED THROUGH DRIVER SEATING SENSOR |
| | | | RECOGNIZING HANDS-ON OF STEERING WHEEL |
| | | | UNABLE TO RECOGNIZE THAT DRIVER IS SEATED CONTINUOUSLY FOR D SECONDS OR MORE THROUGH DRIVER SEATING SENSOR ※ D > B |
| [CONDITION4 - case4] | AND | | UNABLE TO RECOGNIZE THAT DRIVER IS SEATED THROUGH DRIVER SEATING SENSOR |
| | | | UNABLE TO RECOGNIZE HANDS-ON OF STEERING WHEEL |
| | | | DETERMINING THAT DRIVER IS NOT LOOKING AHEAD THROUGH DRIVER MONITORING CAMERA ALTERNATIVELY, DETERMINING THAT DRIVER IS NOT LOOKING AHEAD CONTINUOUSLY FOR A SECONDS OR MORE THROUGH DRIVER MONITORING CAMERA |
| [CONDITION4 - case5] | AND | | UNABLE TO RECOGNIZE THAT DRIVER IS SEATED CONTINUOUSLY FOR B SECONDS OR MORE THROUGH DRIVER SEATING SENSOR |
| | | | UNABLE TO RECOGNIZE HANDS-ON OF STEERING WHEEL |
| | | | DETERMINING THAT DRIVER IS NOT LOOKING AHEAD THROUGH DRIVER MONITORING CAMERA |

Fig.4B

| [CONDITION5] | AND | OR | RECOGNIZING THAT DRIVER IS SEATED THROUGH DRIVER SEATING SENSOR |
| | | | RECOGNIZING DRIVER OR THAT DRIVER IS LOOKING AHEAD THROUGH DRIVER MONITORING CAMERA |
| | | | RECOGNIZING MANIPULATION OF ACCELERATOR PEDAL OR BRAKE PEDAL |
| [CONDITION6 - case1] | AND | | UNABLE TO RECOGNIZE THAT DRIVER IS SEATED THROUGH DRIVER SEATING SENSOR |
| | | | UNABLE TO RECOGNIZE DRIVER THROUGH DRIVER MONITORING CAMERA |
| [CONDITION6 - case2] | AND | | UNABLE TO RECOGNIZE THAT DRIVER IS SEATED THROUGH DRIVER SEATING SENSOR |
| | | | RECOGNIZING MANIPULATION OF ACCELERATOR PEDAL OR BRAKE PEDAL |
| | | | DETERMINING THAT DRIVER IS NOT LOOKING AHEAD CONTINUOUSLY FOR E SECONDS OR MORE THROUGH DRIVER MONITORING CAMERA  ※ E > A |
| [CONDITION6 - case3] | AND | | UNABLE TO RECOGNIZE THAT DRIVER IS SEATED THROUGH DRIVER SEATING SENSOR |
| | | | RECOGNIZING MANIPULATION OF ACCELERATOR PEDAL OR BRAKE PEDAL |
| | | | UNABLE TO RECOGNIZE THAT DRIVER IS SEATED CONTINUOUSLY FOR F SECONDS OR MORE THROUGH DRIVER SEATING SENSOR  ※ F > B |
| [CONDITION6 - case4] | AND | | UNABLE TO RECOGNIZE THAT DRIVER IS SEATED THROUGH DRIVER SEATING SENSOR |
| | | | UNABLE TO RECOGNIZE MANIPULATION OF ACCELERATOR PEDAL OR BRAKE PEDAL |
| | | | DETERMINING THAT DRIVER IS NOT LOOKING AHEAD THROUGH DRIVER MONITORING CAMERA ALTERNATIVELY, DETERMINING THAT DRIVER IS NOT LOOKING AHEAD CONTINUOUSLY FOR A SECONDS OR MORE THROUGH DRIVER MONITORING CAMERA |
| [CONDITION6 - case5] | AND | | UNABLE TO RECOGNIZE THAT DRIVER IS SEATED CONTINUOUSLY FOR B SECONDS OR MORE THROUGH DRIVER SEATING SENSOR |
| | | | UNABLE TO RECOGNIZE MANIPULATION OF ACCELERATOR PEDAL OR BRAKE PEDAL |
| | | | DETERMINING THAT DRIVER IS NOT LOOKING AHEAD THROUGH DRIVER MONITORING CAMERA |

Fig.6B

APPARATUS FOR CONTROLLING AUTOMATED DRIVING, AND METHOD THEREOF

CROSS-REFERENCE TO RELATED APPLICATION

This application claims priority to and the benefit of Korean Patent Application No. 10-2020-0070350, filed on Jun. 10, 2020, the entire contents of which are incorporated herein by reference.

TECHNICAL FIELD

The present invention relates to an autonomous driving control apparatus and a method thereof, and more particularly, to a technology for determining a driver control authority switchable state for activation of an autonomous driving control function.

BACKGROUND

The statements in this section merely provide background information related to the present disclosure and may not constitute prior art.

A conventional autonomous driving system should be activated only when a driver occupies a driver seat and can take control authority, and it should warn the driver when determining that the driver is not in the driver seat or cannot receive the control authority during system activation.

The conventional autonomous driving system uses a single sensor to determine an occupancy status of the driver seat, and in the case of determining the occupancy status with this single sensor, when a sensor limit situation occurs, such as a single sensor failure, the system may be unable to recognize the driver to determine that the driver cannot receive the control authority, thereby performing a false alarm.

In addition, the driver may intentionally induce the autonomous driving system to wrongly recognize the driver seat as being occupied by utilizing characteristics of the single sensor, which in turn decreases reliability of the autonomous driving system.

The above information disclosed in this Background section is only for enhancement of understanding of the background of the invention, and therefore it may contain information that does not form the prior art that is already known in this country to a person of ordinary skill in the art.

SUMMARY

An exemplary embodiment of the present invention has been made in an effort to provide an autonomous driving control apparatus and an autonomous driving control method, capable of minimizing false alarms due to non-recognition by accurately determining whether control authority is switchable based on multiple sensors.

The technical objects of the present invention are not limited to the objects mentioned above, and other technical objects not mentioned can be clearly understood by those skilled in the art from the description of the claims.

An exemplary embodiment of the present invention provides an autonomous driving control apparatus including: a driver seating sensor configured to recognize whether or not the driver is seated; a driver monitoring device configured to recognize a driver or to recognize whether the driver is looking ahead; and a processor configured to determine whether control authority is switchable for activation of an autonomous driving control function based on sensing results of the driver seating sensor and the driver monitoring device.

In an exemplary embodiment, the processor may shift to a control authority transferable state when it is detected that the driver is seated, or it is detected that the driver is looking ahead.

In an exemplary embodiment, the processor may shift to a control authority non-transferable state when it is detected that the driver is not seated, and it is detected that the driver is not looking ahead.

In an exemplary embodiment, the processor may shift to a control authority non-transferable state when it is detected that the driver is not seated and when it is detected that the driver is not looking ahead, or it is detected that the driver is not looking ahead continuously for more than a predetermined first time.

In an exemplary embodiment, the processor may shift to a control authority non-transferable state when it is detected that that the driver is not seated for a predetermined second time, and it is determined that that the driver is not looking ahead.

In an exemplary embodiment, the apparatus may further include a hands-on sensor configured to detect a hands-on state of the driver on steering wheel.

In an exemplary embodiment, the processor shift to a control authority transferable state when the hands-on of the driver is detected and when it is detected that the driver is seated or it is detected that the driver is looking ahead, In an exemplary embodiment, the processor may transition to a control authority non-switchable state when unable to recognize through the driver seating sensor that the driver is seated or unable to recognize the driver through the driver monitoring camera.

In an exemplary embodiment, the processor may transition to a control authority non-switchable state when unable to recognize that the driver is seated through the driver seating sensor, recognizing the hands-on of the driver through the hands-on sensor, and determining that the driver is not looking ahead continuously for a predetermined third time or more through the driver monitoring camera.

In an exemplary embodiment, the third time may be longer than the first time.

In an exemplary embodiment, the processor may transition to a control authority non-switchable state when unable to recognize that the driver is seated through the driver seating sensor, recognizing the hands-on of the driver through the hands-on sensor, and determining that the driver is not seated continuously for a predetermined fourth time or more through the driver seating sensor.

In an exemplary embodiment, the fourth time may be longer than the second time.

In an exemplary embodiment, the apparatus may further include a pedal sensor configured to sense an input of an accelerator pedal or a brake pedal.

In an exemplary embodiment, the processor may transition to a control authority switchable state when recognizing through the driver seating sensor that the driver is seated or recognizing the driver or that the driver is looking ahead through the driver monitoring camera, and sensing an input of the accelerator pedal or the brake pedal through the pedal sensor.

In an exemplary embodiment, the processor may transition to a control authority non-switchable state when unable to recognize through the driver seating sensor that the driver is seated or unable to recognize the driver through the driver monitoring camera.

In an exemplary embodiment, the processor may transition to the control authority non-switchable state when unable to recognize that the driver is seated through the driver seating sensor, sensing the input of the accelerator pedal or the brake pedal through the pedal sensor, and determining that the driver is not looking ahead continuously for a predetermined fifth time or more through the driver monitoring camera.

In an exemplary embodiment, the fifth time may be longer than the first time.

In an exemplary embodiment, the processor may transition to the control authority non-switchable state when unable to recognize that the driver is seated through the driver seating sensor, sensing the input of the accelerator pedal or the brake pedal through the pedal sensor, and determining that the driver is not seated continuously for a predetermined sixth time or more through the driver seating sensor.

In an exemplary embodiment, the processor the fourth time may be longer than the second time.

In an exemplary embodiment, the apparatus may further include an output device configured to output a warning when switching is performed from a control authority switchable state to a control authority non-switchable state.

An exemplary embodiment of the present invention provides an autonomous driving control method, including: recognizing whether or not a driver is seated; recognizing whether a driver is looking ahead; and determining whether control authority is switchable for activating an autonomous driving control function based on the whether the driver is seated and the whether the driver is looking ahead; and activating the autonomous driving control function when the control authority is switchable.

According to this technique, false alarms due to non-recognition may be minimized by accurately determining whether control authority is switchable based on multiple sensors, thereby increasing reliability of the autonomous driving control function.

In addition, various effects that can be directly or indirectly identified through this document may be provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2A and FIG. 2B illustrate views for describing a method for determining a driver control authority switchable state in an autonomous driving control apparatus according to an exemplary embodiment of the present invention.

FIG. 4A and FIG. 4B illustrate views for describing a method for determining a driver control authority switchable state in an autonomous driving control apparatus according to another exemplary embodiment of the present invention.

FIG. 6A and FIG. 6B illustrate views for describing a method for determining a driver control authority switchable state in an autonomous driving control apparatus according to another exemplary embodiment of the present invention.

Figure 1:
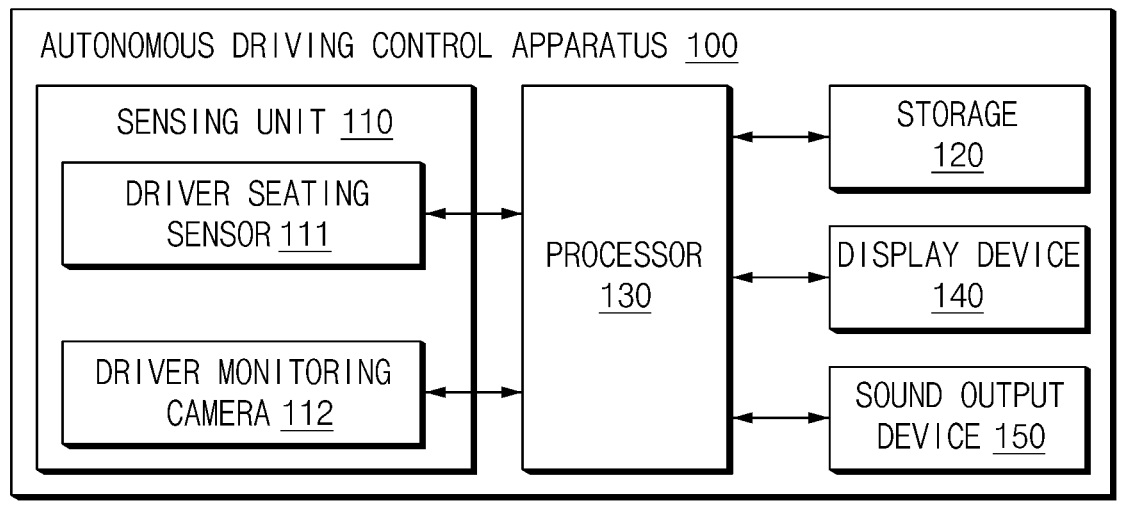
FIG. 1 illustrates a block diagram showing a configuration of a vehicle system including an autonomous driving control apparatus according to an exemplary embodiment of the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to an exemplary embodiment of the present invention, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present invention will be described in detail with reference to FIG. 1 to FIG. 8.

FIG. 1 illustrates a block diagram showing a configuration of a vehicle system including an autonomous driving control apparatus according to an exemplary embodiment of the present invention.

Referring to FIG. 1, according to an exemplary embodiment of the present invention, the autonomous driving control apparatus 100 may be implemented inside a vehicle. In this case, the autonomous driving control apparatus 100 may be integrally formed with internal control units of the vehicle, or may be implemented as a separate device to be connected to control units of the vehicle by a separate connection means.

The autonomous driving control apparatus 100 may determine whether driver control authority is switchable state by accurately determining whether a driver is seated, whether the driver is looking ahead, a hands-on state of the driver, a pedal input state using multiple sensors, and the like, thereby increasing reliability of an autonomous driving control function.

To this end, the autonomous driving control apparatus 100 may include a sensing device 110, a storage 120, a processor 130, a display device 140, and a sound output device 150.

The sensing device 110 senses whether the driver is seated and whether the driver is looking ahead. To this end, the sensing device 110 includes a driver seating sensor 111 and a driver monitoring camera 112. In FIG. 1, one driver seating sensor 111 and one driver monitoring camera 112 are illustrated, but the present invention is not limited thereto, and may include at least one sensor and at least one camera.

The driver seating sensor 111 detects whether the driver is seated in a driver seat. To this end, the driver seating sensor 111 may include a pressure sensor, a weight sensor, an ultrasonic sensor, an acceleration sensor, and the like.

The driver monitoring camera 112 may recognize the driver or monitor whether the driver is looking ahead, and may include at least one cameras for photographing a face of the driver. In this case, it is possible to determine whether driver's eyes are looking ahead based on image data obtained by photographing the driver face.

The storage 120 may store sensing results of the sensing device 110, data obtained by the processor 130, data and/or algorithms required for the processor 130 to operate, and the like.

As an example, the storage 120 may store a result of sensing whether the driver is seated, image data obtained by photographing the driver face, and the like. In addition, the storage 120 may store data and/or algorithms for autonomous driving control.

The storage 120 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the sensing device 110, the storage 120, the display device 140, the sound output device 150, and the like, may electrically control each component, and may be an electrical circuit that executes software commands, thereby performing various data processing and calculations described below. The processor 130 may be, e.g., an electronic control unit (ECU), a micro controller unit (MCU), or other subcontrollers mounted in the vehicle.

The processor 130 may determine whether control authority is switchable for activation of an autonomous driving control function based on sensing results of the driver seating sensor 111 and the driver monitoring camera 112 (driver monitoring device). The control authority switchable state indicates a state in which a driver can receive control authority at any time while the autonomous driving control function is activated. The processor 130 may activate the autonomous driving control function in the control authority switchable state, and may not activate the autonomous driving control function in a control authority non-switchable state.

The processor 130 may transition to the control authority switchable state when recognizing through the driver seating sensor 111 that the driver is seated, and recognizing the driver or that the driver is looking ahead through the driver monitoring camera 112.

The processor 130 may transition to the control authority non-switchable state when recognizing through the driver seating sensor 111 that the driver is seated or unable to recognize the driver through the driver monitoring camera 112. The control authority non-switchable state indicates a state in which a driver is not able to receive control authority while the autonomous driving control function is activated.

The processor 130 may transition to the control authority non-switchable state when unable to recognize through the driver seating sensor 111 that the driver is seated and determining through the driver monitoring camera 112 that a driver is not looking ahead or that the driver is not looking ahead continuously for more than a predetermined first time. In this case, the first time may be set in advance as an experimental value.

The processor 130 may transition to the control authority non-switchable state when unable to recognize through the driver seating sensor 111 that the driver is seated for a predetermined second time or more and determining through the driver monitoring camera 112 that a driver is not looking ahead The display device 140 and the sound output device 150, which are output devices, may display and output warnings when the driver is not seated, or when the driver is not looking ahead or the driver is not gripping a steering wheel during activation of the autonomous driving control function. When the autonomous driving function is switched from an activation state to an inactivation state, the display device 140 and the sound output device 150 may display and output the switched inactivation state to allow the driver to recognize that the autonomous driving function is switched to the inactivation state.

The display device 140 may display a visual phrase and a screen, and may include a display. In addition, when a touch sensor formed of a touch film, a touch sheet, or a touch pad is provided on the display, the display may operate as a touch screen, and may be implemented in a form in which an input device and an output device are integrated. In this case, the display may include at least one of a liquid crystal display (LCD), a thin film transistor liquid crystal display (TFT LCD), an organic light emitting diode display (OLED display), a flexible display, a field emission display (FED), and a 3D display.

The sound output device 150 may also include a voice output means such as a speaker.

Figure 2A:
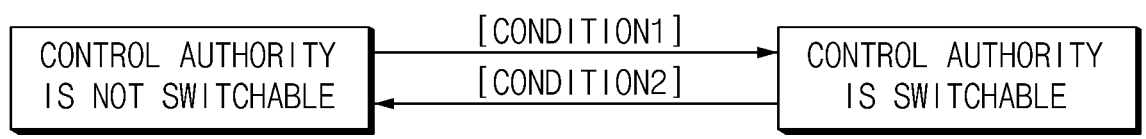

FIG. 2A and FIG. 2B illustrate views for describing a method for determining a driver control authority switchable state in an autonomous driving control apparatus according to an exemplary embodiment of the present invention.

Referring to FIG. 2A, the apparatus 100 transitions to the control authority switchable state when Condition 1 is satisfied in the control authority non-switchable state of a driver. In addition, the apparatus 100 transitions to the control authority non-switchable state when Condition 2 is satisfied in the control authority switchable state of the driver.

Referring to FIG. 2B, examples of Conditions 1 and 2 are specifically described.

For Condition 1, the apparatus 100 transitions from the control authority non-switchable state of the driver to the control authority switchable state when sensing through the driver seating sensor 111 that the driver is seated in the driver seat and recognizing the driver or that the driver is looking ahead through the driver monitoring camera 112.

That is, the apparatus 100 determines that the control authority is switchable when both the driver seating sensor 111 and the driver monitoring camera 112 recognize that the driver is seated.

Condition 2 is divided into three cases as illustrated in FIG. 4B, and for Case 1 of Condition 2, the apparatus 100 transitions from the control authority switchable state of the driver to the control authority non-switchable state when unable to recognize that the driver is seated in the driver seat through the driver seating sensor 111 and unable to recognize the driver through the driver monitoring camera 112.

For Case 2 of Condition 2, the apparatus 100 transitions from the control authority switchable state of the driver to the control authority non-switchable state when unable to recognize that the driver is seated in the driver seat through the driver seating sensor 111, and determining through the driver monitoring camera 112 that the driver is not looking ahead or that the driver is not looking ahead continuously for A seconds or more. In this case, A may be set in advance as an experimental value.

For Case 3 of Condition 2, the apparatus 100 transitions from the control authority switchable state of the driver to the control authority non-switchable state when unable to recognize that the driver is seated in the driver seat for B seconds or more through the driver seating sensor 111 and determining that the driver is not looking ahead through the driver monitoring camera 112. In this case, B may be set in advance as an experimental value.

Figure 3:
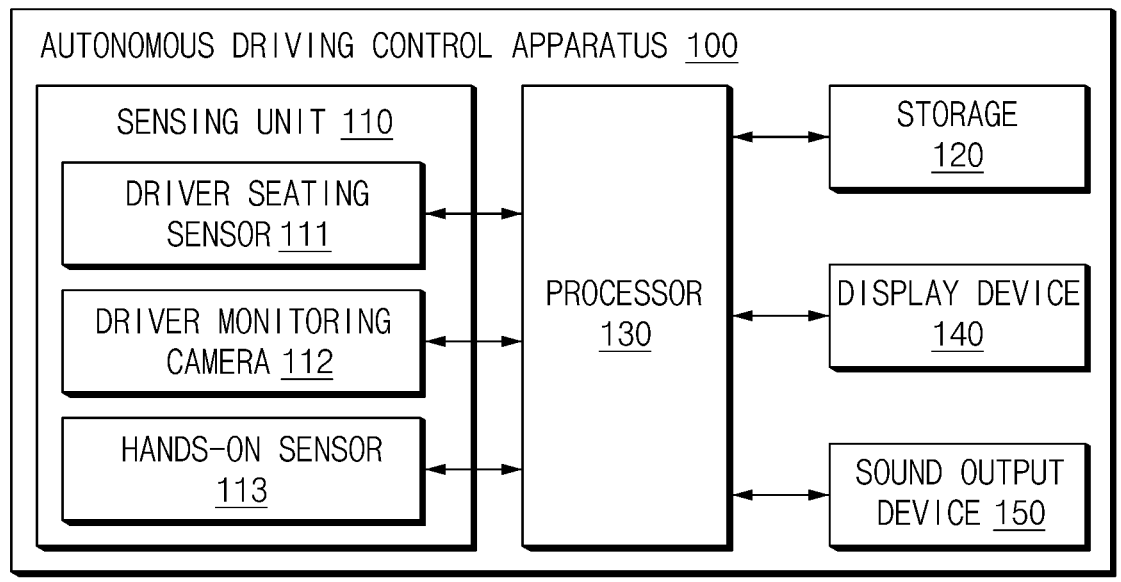
FIG. 3 illustrates a block diagram showing a configuration of a vehicle system including an autonomous driving control apparatus according to another exemplary embodiment of the present invention.

FIG. 3 illustrates a block diagram showing a configuration of a vehicle system including an autonomous driving control apparatus according to another exemplary embodiment of the present invention.

Referring to FIG. 3, a hands-on sensor 113 is further included according to another exemplary embodiment of the present invention as compared with the exemplary embodiment of FIG. 1.

The hands-on sensor 113 senses whether a driver hand is gripping a steering wheel.

The processor 130 may transition to the control authority switchable state when recognizing through the driver seating sensor 111 that the driver is seated or recognizing the driver or that the driver is looking ahead through the driver monitoring camera 112, and sensing a hands-on of the driver through the hands-on sensor 113.

The processor 130 may transition to the control authority non-switchable state when unable to recognize through the driver seating sensor 111 that the driver is seated or unable to recognize the driver through the driver monitoring camera 112.

The processor 130 may transition to the control authority non-switchable state when unable to recognize that the driver is seated through the driver seating sensor 111, recognizing the hands-on of the driver through the hands-on sensor 113, and determining that the driver is not looking ahead continuously for a predetermined third time or more through the driver monitoring camera 112. In this case, the third time may be set longer than the first time. That is, even in the case where it is not able to be recognized that the driver is seated in the driver seat through the driver seating sensor 111 or where the driver is not looking ahead, when the driver is in the hands-on state, a time for determining whether the driver is looking ahead may be increased to make the determination clearer.

The processor 130 may transition to the control authority non-switchable state when unable to recognize that the driver is seated through the driver seating sensor 111, recognizing the hands-on of the driver through the hands-on sensor 113, and determining that the driver is not seated continuously for a predetermined fourth time or more through the driver seating sensor 111. In this case, the fourth time may be set to be longer than the second time, so that when the driver is in the hands-on state, a time for determining whether the driver is seated may be increased to make the determination clearer.

Figure 4A:
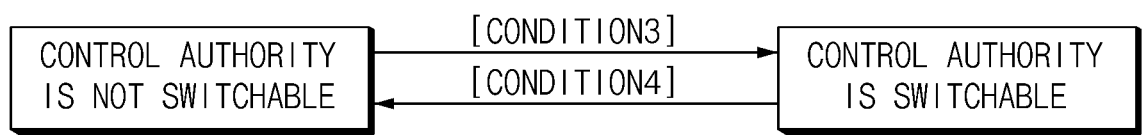

FIG. 4A and FIG. 4B illustrate views for describing a method for determining a driver control authority switchable state in an autonomous driving control apparatus according to another exemplary embodiment of the present invention.

Referring to FIG. 4A, the apparatus 100 transitions to the control authority switchable state when Condition 3 is satisfied in the control authority non-switchable state of a driver. In addition, the apparatus 100 transitions to the control authority non-switchable state when Condition 4 is satisfied in the control authority switchable state of the driver.

Referring to FIG. 4B, examples of Conditions 3 and 4 are specifically described.

For Condition 3, the apparatus 100 transitions from the control authority non-switchable state of the driver to the control authority switchable state when sensing through the driver seating sensor 111 that the driver is seated in the driver seat, or recognizing the driver or that the driver is looking ahead through the driver monitoring camera 112, and sensing a hands-on state of the driver.

Condition 4 is divided into five cases as shown in FIG. 4B, and for Case 1 of Condition 4, the apparatus 100 transitions from the control authority switchable state of the driver to the control authority non-switchable state when unable to recognize that the driver is seated in the driver seat through the driver seating sensor 111 and unable to recognize the driver through the driver monitoring camera 112.

For Case 2 of Condition 4, the apparatus 100 transitions from the control authority switchable state of the driver to the control authority non-switchable state when unable to recognize that the driver is seated in the driver seat through the driver seating sensor 111 and recognizing the hands-on state based on the hands-on sensor 113, and determining that the driver is not looking ahead for C seconds or more through the driver monitoring camera 112. In this case, C may be set as a value that is greater than A. That is, when the driver is in the hands-on state, a time for determining whether the driver is looking ahead may be increased to make the determination more accurate.

For Case 3 of Condition 4, the apparatus 100 transitions from the control authority switchable state of the driver to the control authority non-switchable state when unable to recognize that the driver is seated in the driver seat through the driver seating sensor 111 and recognizing the hands-on state based on the hands-on sensor 113, and determining that the driver is not looking ahead through the driver monitoring camera 112. That is, when the driver is in the hands-on state, a time for determining whether the driver is seated may be increased to make the determination more accurate.

For Case 4 of Condition 4, the apparatus 100 transitions from the control authority switchable state of the driver to the control authority non-switchable state when unable to recognize that the driver is seated in the driver seat through the driver seating sensor 111 and unable to recognize that the hands-on state based on the hands-on sensor 113, and determining that the driver is not looking ahead or determining that the driver is not looking ahead for A seconds or more through the driver monitoring camera 112.

For Case 5 of Condition 4, the apparatus 100 transitions from the control authority switchable state of the driver to the control authority non-switchable state when unable to continuously recognize that the driver is seated in the driver seat through the driver seating sensor 111 for B seconds or more and unable to recognize the hands-on state based on the hands-on sensor 113, and determining that the driver is not looking ahead through the driver monitoring camera 112.

Figure 5:
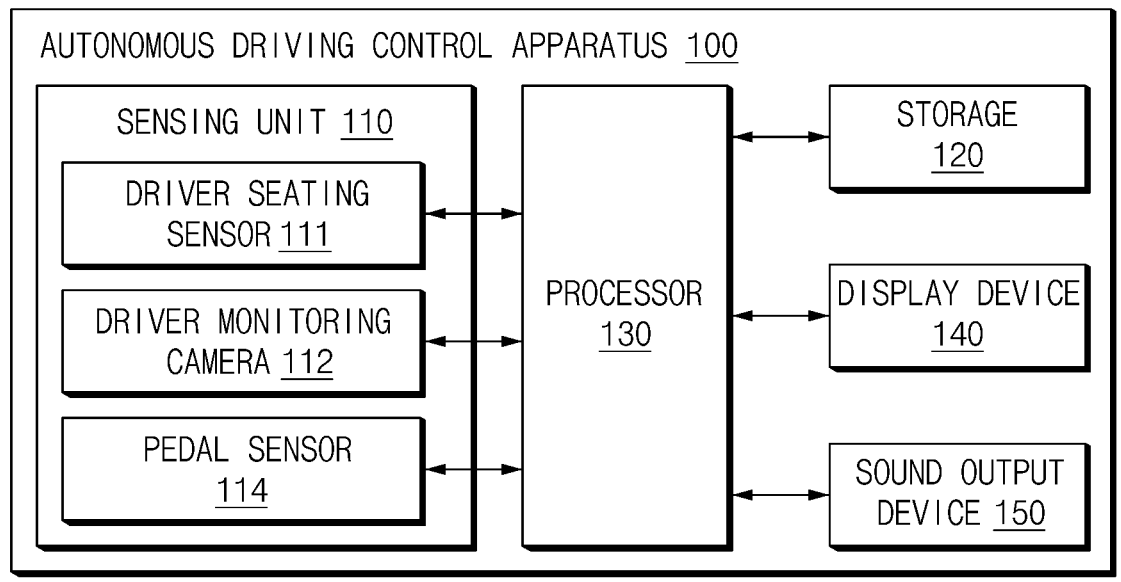
FIG. 5 illustrates a block diagram showing a configuration of a vehicle system including an autonomous driving control apparatus according to another exemplary embodiment of the present invention.

FIG. 5 illustrates a block diagram showing a configuration of a vehicle system including an autonomous driving control apparatus according to another exemplary embodiment of the present invention.

Referring to FIG. 5, a pedal sensor 114 is further included according to another exemplary embodiment of the present invention as compared with the exemplary embodiment of FIG. 1.

The pedal sensor 114 senses a pressure applied to an accelerator pedal or a brake pedal for controlling deceleration or acceleration of the vehicle.

The processor 130 may transition to the control authority switchable state when recognizing through the driver seating sensor 111 that the driver is seated or recognizing the driver or that the driver is looking ahead through the driver monitoring camera 112, and sensing an input of the accelerator pedal or the brake pedal through the pedal sensor 114.

The processor 130 may transition to the control authority non-switchable state when unable to recognize through the driver seating sensor 111 that the driver is seated or unable to recognize the driver through the driver monitoring camera 112.

The processor 130 may transition to the control authority non-switchable state when unable to recognize that the driver is seated through the driver seating sensor 111, sensing the input of the accelerator pedal or the brake pedal through the pedal sensor 114, and determining that the driver is not looking ahead continuously for a predetermined fifth time or more through the driver monitoring camera 112. In this case, the fifth time is set to be longer than the first time, so that even in the case where it is not recognized through the driver seating sensor 111 that the driver is seated or the driver is not recognized through the driver monitoring camera 112, when a pedal input is sensed, a time for driver monitoring may be increased to make the determination clearer.

The processor 130 may transition to the control authority non-switchable state when unable to recognize that the driver is seated through the driver seating sensor 111, sensing the input of the accelerator pedal or the brake pedal through the pedal sensor 114, and determining that the driver is not seated continuously for a predetermined sixth time or more through the driver seating sensor 111. In this case, the sixth time is set to be longer than the second time, so that even in the case where it is not able to be recognized that the driver is seated through the driver seating sensor 111, when the pedal input is sensed, the processor may increase the time for determining whether the driver is seated to make the determination clearer.

Figure 6A:
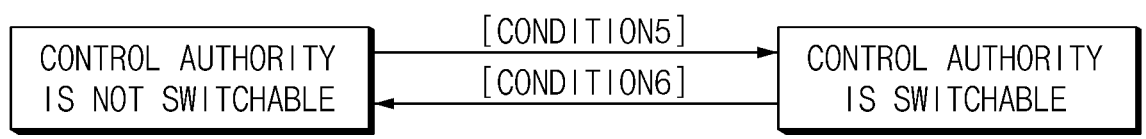

FIG. 6A and FIG. 6B illustrate views for describing a method for determining a driver control authority switchable state in an autonomous driving control apparatus according to another exemplary embodiment of the present invention.

Referring to FIG. 6A, the apparatus 100 transitions to the control authority switchable state when Condition 5 is satisfied in the control authority non-switchable state of a driver. In addition, the apparatus 100 transitions to the control authority non-switchable state when Condition 6 is satisfied in the control authority switchable state of the driver.

Referring to FIG. 6B, examples of Conditions 5 and 6 are specifically described.

For Condition 5, the apparatus 100 transitions from the control authority non-switchable state of the driver to the control authority switchable state when recognizing through the driver seating sensor 111 that the driver is seated in the driver seat, or recognizing the driver or that the driver is looking ahead through the driver monitoring camera 112, and recognizing manipulation of the accelerator pedal or the brake pedal.

Condition 6 is divided into five cases as shown in FIG. 6B, and for Case 1 of Condition 6, the apparatus 100 transitions from the control authority switchable state of the driver to the control authority non-switchable state when unable to recognize that the driver is seated in the driver seat through the driver seating sensor 111 and unable to recognize the driver through the driver monitoring camera 112.

For Case 2 of Condition 6, the apparatus 100 transitions from the control authority switchable state of the driver to the control authority non-switchable state when unable to recognize that the driver is seated in the driver seat through the driver seating sensor 111, recognizing that the manipulation of the accelerator pedal or the brake pedal, and determining that the driver is not looking ahead continuously for E seconds or more through the driver monitoring camera 112. In this case, E may be set as a value that is greater than A. That is, when the manipulation of the accelerator pedal or the brake pedal by the driver is recognized, a time for determining whether the driver is looking ahead may be increased to make the determination more accurate.

For Case 3 of Condition 6, the apparatus 100 transitions from the control authority switchable state of the driver to the control authority non-switchable state when unable to recognize that the driver is seated in the driver seat through the driver seating sensor 111, recognizing manipulation of the accelerator pedal or the brake pedal, and unable to recognize that the driver is seated continuously for F seconds or more through the driver seating sensor. That is, when the manipulation of the accelerator pedal or the brake pedal is recognized, a time for determining whether the driver is seated may be increased to make the determination more accurate.

For Case 4 of Condition 6, the apparatus 100 transitions from the control authority switchable state of the driver to the control authority non-switchable state when unable to recognize that the driver is seated in the driver seat through the driver seating sensor 111, unable to recognize that the manipulation of the accelerator pedal or the brake pedal, and determining through the driver monitoring camera 112 that the driver is not looking ahead or that the driver is not looking ahead continuously for A seconds or more.

For Case 5 of Condition 6, the apparatus 100 transitions from the control authority switchable state of the driver to the control authority non-switchable state when unable to recognize that the driver is seated in the driver seat continuously for B seconds or more through the driver seating sensor 111, unable to recognize that the manipulation of the accelerator pedal or the brake pedal, and determining that the driver is not looking ahead through the driver monitoring camera 112.

Figure 7:
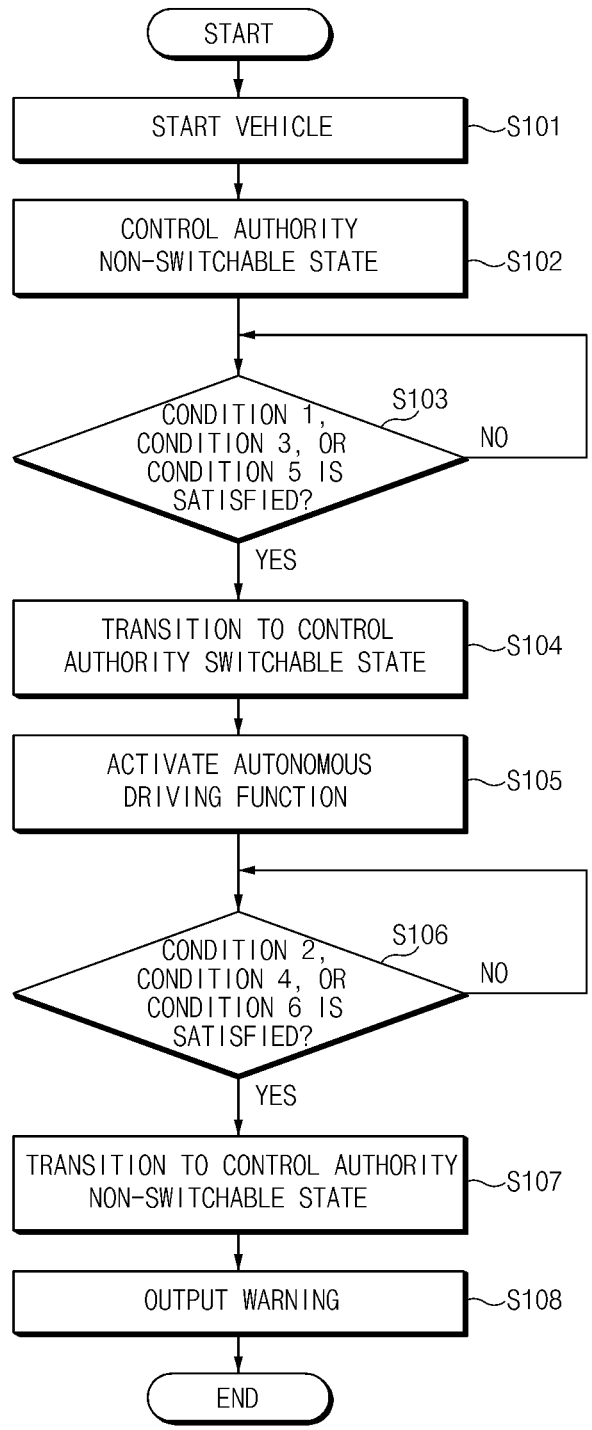
FIG. 7 illustrates an autonomous driving control method for a vehicle according to an exemplary embodiment of the present invention.

Hereinafter, an autonomous driving control method according to an exemplary embodiment of the present invention will be described in detail with reference to FIG. 7. FIG. 7 illustrates an autonomous driving control method for a vehicle according to an exemplary embodiment of the present invention.

Hereinafter, it is assumed that the autonomous driving control apparatus 100 of the of FIG. 1 performs processes of FIG. 7. In addition, in the description of FIG. 7, operations described as being performed by a device may be understood as being controlled by the processor 130 of the autonomous driving control apparatus 100 of the.

Referring to FIG. 7, when a vehicle is started (S101), the autonomous driving control apparatus 100 transitions to a control authority non-switchable state at a beginning of starting (S102).

Thereafter, the autonomous driving control apparatus 100 determines whether at least one of Conditions 1, 3, and 5 described in FIG. 2B, FIG. 4B, and FIG. 6B described above is satisfied (S103), and when at least one of Condition 1, condition 3, and condition 5 is satisfied, determines that control authority is switchable and transitions to the control authority switchable state (S104). That is, the apparatus 100 may determine that the control authority is switchable when determining that the driver is seated through at least two sensors of the driver seating sensor 111, the driver monitoring camera 112, the hands-on sensor 113, and the pedal sensor 114 based on their output values.

The autonomous driving control apparatus 100 activates an autonomous driving function in a state in which the control authority is switchable (S105).

In addition, the autonomous driving control apparatus 100 determines whether at least one of Conditions 2, 4, and 6 described in FIG. 2B, FIG. 4B, and FIG. 6B described above is satisfied (S106), and when at least one of Condition 2, condition 4, and condition 6 is satisfied, determines that control authority is not switchable and transitions to the control authority non-switchable state (S107).

Subsequently, the autonomous driving control apparatus 100 warns that control authority switching is impossible through the display device 140 and the sound output device 150 (S108).

As described above, according to the present invention, it is possible to minimize non-recognition and wrong recognition by determining whether the control authority of the driver is switchable by using multiple sensors, and it is possible to minimize false alarms by reducing the non-recognition whether the control authority of the driver is switchable during activation of the autonomous driving control function.

Figure 8:
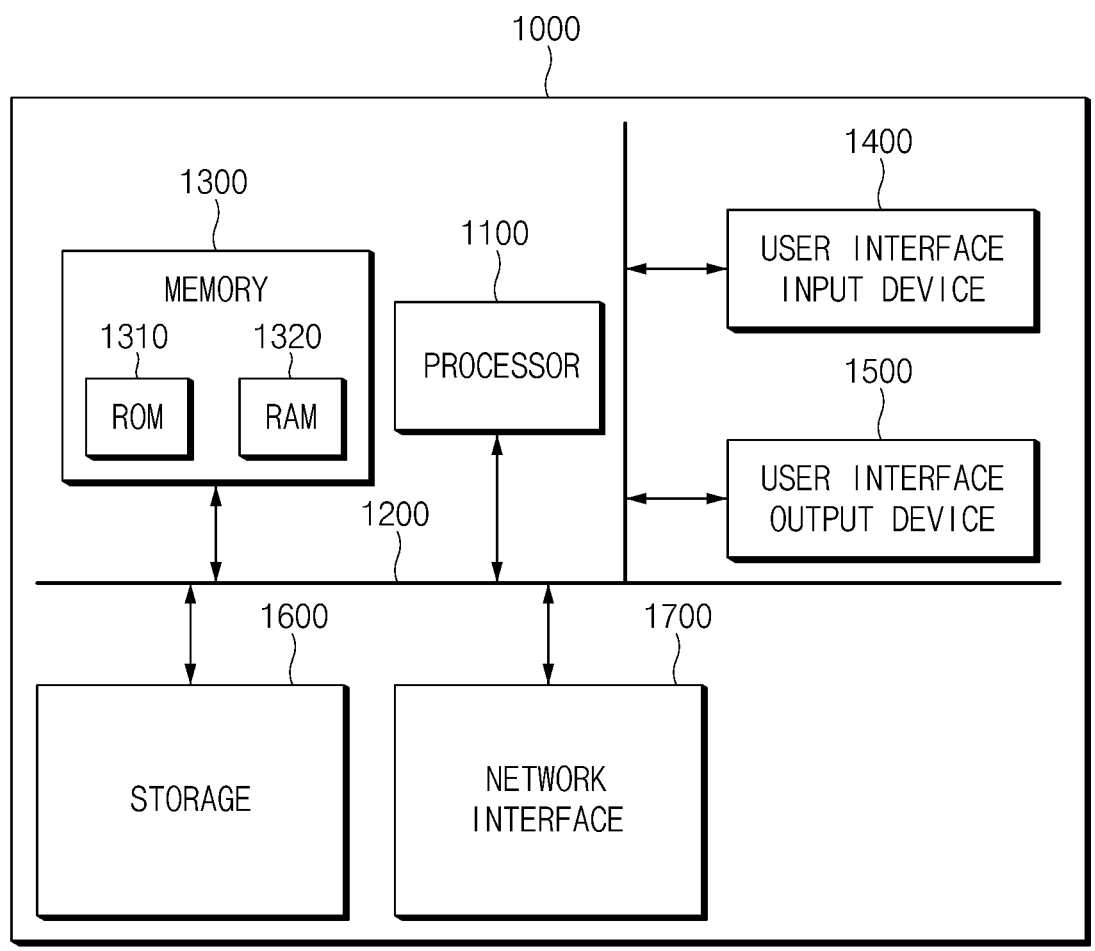
FIG. 8 illustrates a computing system according to an exemplary embodiment of the present invention.

FIG. 8 illustrates a computing system according to an exemplary embodiment of the present invention.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which the present invention pertains may make various modifications and variations without departing from the essential characteristics of the present invention.

Therefore, the exemplary embodiments disclosed in the present invention are not intended to limit the technical ideas of the present invention, but to explain them, and the scope of the technical ideas of the present invention is not limited by these exemplary embodiments. The protection range of the present invention should be interpreted by the claims below, and all technical ideas within the equivalent range should be interpreted as being included in the scope of the present invention.

What is claimed is:

1. An autonomous driving control apparatus comprising:
a driver seating sensor configured to detect whether or not a driver is seated;
a driver monitoring device configured to detect whether the driver is looking ahead;
a hands-on sensor configured to detect a hands-on state of the driver on a steering wheel; and
a processor configured to determine whether control authority for activating an autonomous driving control function is transferable based at least on results of the driver seating sensor and the driver monitoring device,
wherein the processor is further configured to shift to a control authority non-transferable state when it is detected by the driver seating sensor that the driver is not seated and when it is detected by the driver monitoring device that the driver is not looking ahead, or when it is detected by the driver seating sensor that the driver is not seated and it is determined by the driver monitoring device that the driver is not looking ahead continuously for more than a predetermined first time, or shift to the control authority non-transferable state when it is detected by the driver seating sensor that that the driver is not seated for a predetermined second time, and it is determined by the driver monitoring device that that the driver is not looking ahead, or shift to the control authority non-transferable state when it is detected by the driver seating sensor that the driver is not seated, the hands-on state of the driver is detected, and it is detected by the driver monitoring device that the driver is not looking ahead continuously for a predetermined third time,
wherein the predetermined third time is longer than the predetermined first time.

2. The autonomous driving control apparatus of claim 1, wherein the processor is further configured to:
  shift to a control authority transferable state when it is detected by the driver seating sensor that the driver is seated, or it is detected by the driver monitoring device that the driver is looking ahead.

3. The autonomous driving control apparatus of claim 1, wherein the processor is further configured to:
  shift to the control authority non-transferable state when it is detected by the driver seating sensor that the driver is not seated, and it is detected by the driver monitoring device that the driver is not looking ahead.

4. The autonomous driving control apparatus of claim 1, wherein the processor is further configured to:
  shift to a control authority transferable state when the hands-on state of the driver is detected and when it is detected by the driver seating sensor that the driver is seated or it is detected by the driver monitoring device that the driver is looking ahead.

5. The autonomous driving control apparatus of claim 1, wherein the processor is further configured to:
  shift to the control authority non-transferable state when it is detected by the driver seating sensor that the driver is not seated, and the driver is not detected by the monitoring device.

6. The autonomous driving control apparatus of claim 1, wherein the processor is further configured to:
  shift to the control authority non-transferable state when it is detected by the driver seating sensor that the driver is not seated, the hands-on state of the driver is detected, and it is detected that the driver is not seated continuously for a predetermined fourth time.

7. The autonomous driving control apparatus of claim 6, wherein the processor is further configured to:
  shift to the control authority non-transferable state when it is detected by the driver seating sensor that the driver is not seated for the predetermined third time, and it is detected by the driver monitoring device that the driver is not looking ahead, wherein the predetermined fourth time is longer than the predetermined third time.

8. The autonomous driving control apparatus of claim 1, wherein the apparatus further comprises:
  a pedal sensor configured to detect an input of an accelerator pedal or a brake pedal.

9. The autonomous driving control apparatus of claim 8, wherein the processor is further configured to:
  shift to a control authority transferable state when the input of the accelerator pedal or the brake pedal is detected, and when it is detected that the driver is seated or it is detected by the driver monitoring device that the driver is looking ahead.

10. The autonomous driving control apparatus of claim 8, wherein the processor is further configured to:
  shift to the control authority non-transferable state when it is detected by the driver seating sensor that the driver is not seated, and the driver is not detected by the monitoring device.

11. The autonomous driving control apparatus of claim 8, wherein the processor is further configured to:
  shift to the control authority non-transferable state when it is detected by the driver seating sensor that the driver is not seated, the input of the accelerator pedal or the brake pedal is detected, and it is detected by the driver monitoring device that the driver is not looking ahead continuously for a predetermined fifth time.

12. The autonomous driving control apparatus of claim 11, wherein the processor is further configured to:
  shift to the control authority non-transferable state when it is detected by the driver seating sensor that the driver is not seated and it is detected by the driver monitoring device that the driver is not looking ahead, or when it is detected by the driver monitoring that the driver is not looking ahead continuously for more than the predetermined first time, wherein the predetermined fifth time is longer than the predetermined first time.

13. The autonomous driving control apparatus of claim 8, wherein the processor is further configured to:
  shift to the control authority non-transferable state when it is detected by the driver seating sensor that the driver is not seated, the input a the accelerator pedal or the brake pedal is detected, and it is detected that the driver is not seated continuously for a predetermined sixth time.

14. The autonomous driving control apparatus of claim 13, wherein the processor is further configured to:
  shift to the control authority non-transferable state when it is detected by the driver seating sensor that the driver is not seated for the predetermined second time, and it is detected by the driver monitoring that the driver is not looking ahead, wherein the predetermined sixth time is longer than the predetermined second time.

15. The autonomous driving control apparatus of claim 1, wherein the apparatus further comprises:
  an output device configured to output a warning when a control authority transferable state is switched to the control authority non-transferable state.

\* \* \* \* \*